Jan. 15, 1946.   H. A. ZAHL   2,392,873
ART OF LOCATING OBJECTS BY HEAT RADIATION
Filed April 3, 1934   2 Sheets-Sheet 1
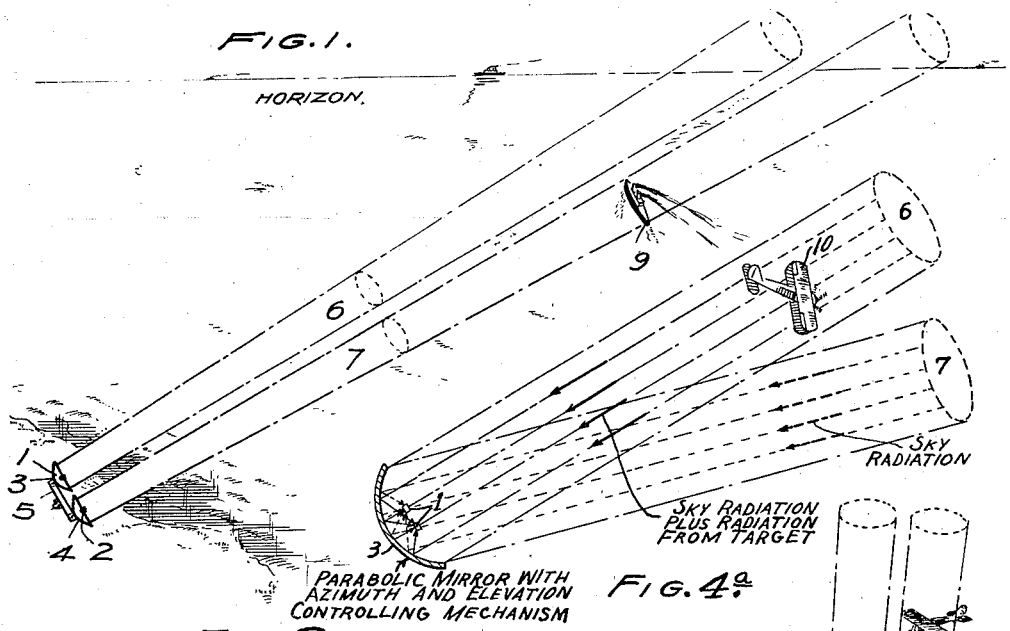
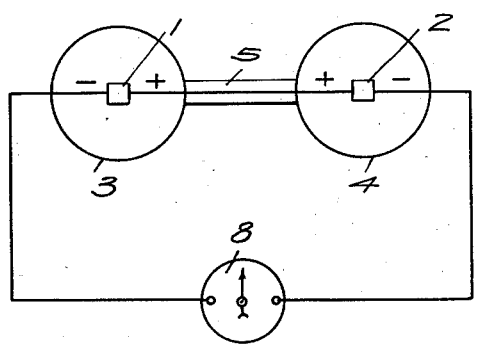
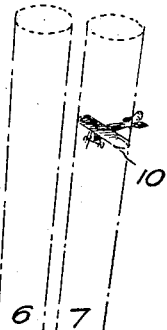
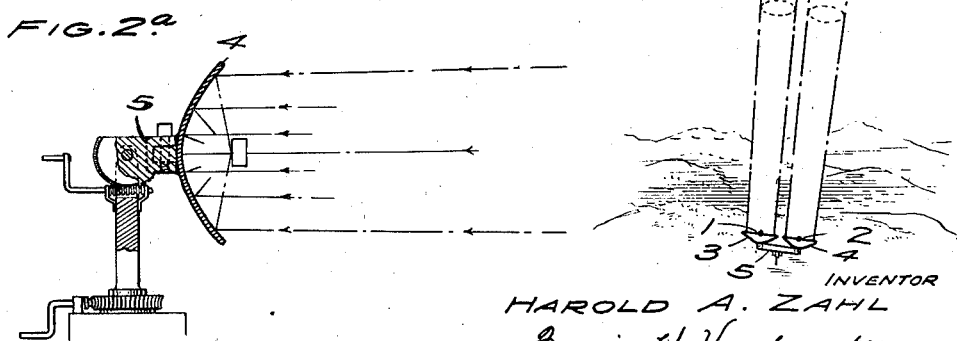
INVENTOR
HAROLD A. ZAHL
BY
ATTORNEYS Jan. 15, 1946.  H. A. ZAHL  2,392,873
ART OF LOCATING OBJECTS BY HEAT RADIATION
Filed April 3, 1934  2 Sheets-Sheet 2

INVENTOR
HAROLD A. ZAHL
BY Francis H. Vanderwerker
Charles Q. Rowe
ATTORNEYS

Patented Jan. 15, 1946

2,392,873

UNITED STATES PATENT OFFICE 2,392,873

ART OF LOCATING OBJECTS BY HEAT RADIATION

Harold A. Zahl, Fort Monmouth, N. J., assignor to the United States of America, as represented by the Secretary of War Application April 3, 1934, Serial No. 718,884

16 Claims. (Cl. 250—1)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a system of detecting the presence and locating the position of objects by their heat radiation, or by means of the temperature differential between an object and its surroundings or its background, or other extraneous sources.

The invention utilizes that form of radiant energy which falls under the general designation of thermal radiation and including the long, infra red or invisible heat rays emitted by objects, whose location is thus made possible whether under cover of darkness or otherwise out of the ordinary range of visibility.

The invention proposes a method and means of determining the position of a body by thermal radiation, whether from the body itself, from its immediate surroundings or background or a combination thereof.

An object is to determine the azimuth or position of a body whose temperature differs from its surroundings or background; or a case where the body is at the same temperature as its surroundings, but different from the effective temperature of its background.

Another important object of the invention is to provide a system of detection of a body with the feature of compensating for the temperature effects of the media surrounding the body; and for automatically balancing out the effects of the temperature differential between the position of the observing equipment and the effective temperature of the region being scanned.

By way of introduction, reference is made to the usual method of detecting the presence of a body by means of heat radiated therefrom. A thermopile is placed at the focus of a parabolic reflector. Radiation originating within the confines of the beam defined by the reflector and falling on the reflecting surface is concentrated on the thermopile causing a flow of direct current, the magnitude and sign of which is a function of the temperature difference between the opposite sets of junctions of the thermopile. This feeble current response may be read, among other methods, either directly by a galvanometer; or it may be rapidly interrupted, amplified by alternating current methods and the amplified output read by more rugged instruments adapted for portable use.

One of the most serious difficulties of such a simple system results from the natural temperature variations existing in the regions in which "heat location" of certain bodies may be desirable. For example, in the location of ships the reflector is generally set quite close to the water's edge so that both water and sky may appear in the solid angle determined by the reflector system. It is well known that under average daylight conditions, water has a temperature which may differ considerably from the ambient temperature of the thermopile. The same may hold true for the effective temperature of the sky which is, in general, different from that of large bodies of water. As a result, a single thermopile at the focus of a parabolic reflector may generate a considerable E. M. F. when pointed either at the water or the sky during the daytime. The presence of this large background effect is thus detrimental when it is considered that the radiations received from the ship may be relatively small. In addition, since the beam of the reflector is subtended by both sky and water, the superposition of differing water and sky radiations results in a varying thermopile current with horizontal motion of the beam unless the ratio of the solid angle subtended by the sky and water, respectively, remains the same.

During night operation similar difficulties exist. Though the water remains at approximately daytime temperature, the atmosphere rapidly cools off and if the sky is clear, the change at the horizon remains though the sign of the E. M. F. generated may be reversed from that of the daytime condition. During night time, location of aircraft by a single thermopile and reflector would be extremely difficult because the atmosphere does not cool uniformly and there may be tremendous variations in the thermopile current as the beam passes from horizon to zenith.

In each of the instances discussed above, compensation of background heat radiation by an external E. M. F. of opposite sign does not possess much merit unless this E. M. F. can be caused to pass through variations corresponding to those of the background against which it is compensating.

In a system embodying the present invention and hereinafter more fully described, several advantageous features are initially emphasized as follows:

a. Detrimental effects of background radiation are automatically balanced and b. Background radiation is utilized in detecting the presence of a body.

The structural organization and mode of operation will now be described in detail with reference to the accompanying drawings, in which:

Fig. 1 is a general view depicting an application of the invention for locating water craft;

Fig. 2 is a diagrammatical view of one form or embodiment of the invention employing two reflectors and a thermo-electric generator operative with each of said reflectors;

Fig. 2a is a view to show the method of adjustment of the two reflectors both in azimuth and altitude, also the adjustment of the reflectors individually, as applied to the form shown in Fig. 2.

Figure 4:
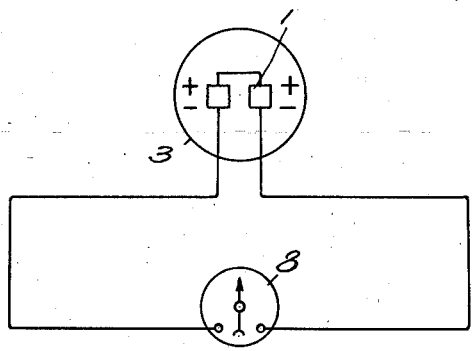
Figure 5:
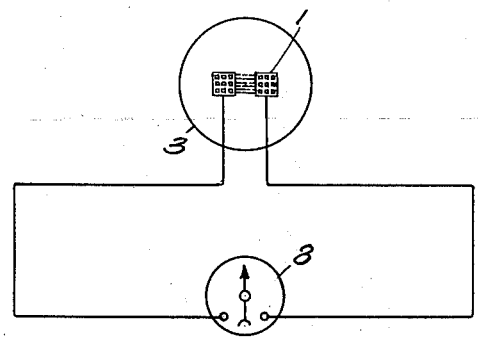
Figure 6:
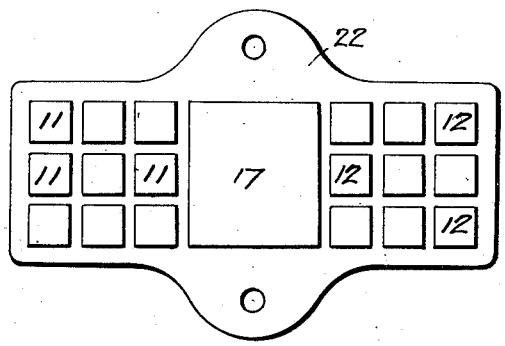
Figure 7:
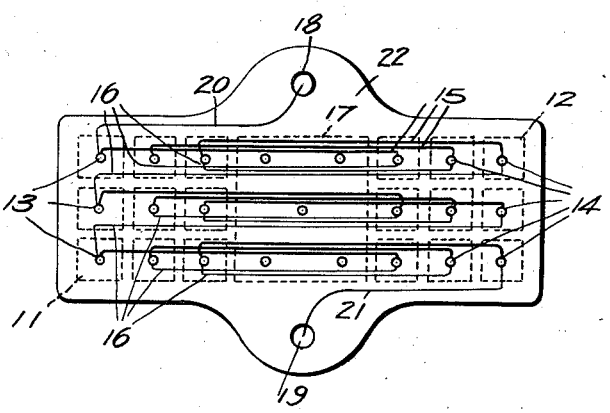

Fig. 3 generally depicts an application of the invention for locating aircraft;

Fig. 4 is a diagrammatical view of another embodiment of the invention employing two thermoelectric generators with a single reflector;

Fig. 4a is a view showing an application of the invention for locating aircraft by employing two thermo-electric generator units mounted in a single reflector;

Fig. 5 shows a third form, employing with a single reflector a thermo-electric generator of which both junctions, or sets of junctions, are exposed to the incoming radiation;

Fig. 6 is a plan view in detail of the front or face of a thermo-electric generator of the type shown in Fig. 5; and Fig. 7 is a rear view of the same showing the arrangement of the two sets of exposed junctions of each thermo-pile unit and the wiring connections.

Referring to Figs. 1 and 2 of the drawings, in the form of invention employing two thermopiles and two mirrors or reflectors, two identical thermopiles 1 and 2 are mounted at the focal points of identical parabolic reflectors 3 and 4, one thermopile being placed at the focus of each reflector. The two reflectors are carried by a connecting bar 5 to function as a common axis and means is provided to permit adjustment of both reflectors together either in azimuth or altitude. It is also understood that the reflectors are capable of adjustment individually so that beams 6 and 7 may be made slightly divergent so that their boundaries do not intersect. The bar 5 is coincident with an axis which falls in the plane defined by the central lines of the imaginary beams 6 and 7. It is understood that the system comprises means of adjustment so that the reflector system may be rotated about an axis parallel to 5 and also about an axis perpendicular to 5, as will appear from Fig. 2a.

Referring to the circuit system shown in Fig. 2, thermopiles 1 and 2 are so connected that when the solid angles 6 and 7 of the two reflectors are subtended by equal areas and with the same effective temperature the voltages generated by each of the two thermopiles are equal but act in opposition. A galvanometer as at 8 may be used for reading the current response from the thermopile system.

One application of the system as exemplified by the form above disclosed will now be considered for locating ships. Referring again to Fig. 1, the apparatus is adjusted so that the horizontal axis as represented by connecting bar 5 is parallel with the horizon line, and consequently imaginary beams 6 and 7 are always subtended by equal areas of water and sky. As a result, if there are no ships or other bodies in either beam, the total heat radiation gathered by the reflectors 3 and 4 and falling on the thermopiles 1 and 2, respectively, is exactly the same, and the resultant current flow through the galvanometer 8 is zero.

If a ship 9 enters either of the beams, two related changes may occur. First, radiation from the hull or stacks of the vessel may increase the radiant energy falling on the corresponding thermopile, for instance beam 7 and thermopile 2 of Fig. 1, and upset the balance which would be indicated by a flow of current in the galvanometer. If background radiation were negligible, this effect would be all that would occur. However, if the effective background temperature be considerably different from the ambient temperature of the thermopile, then the "shadow" of the ship would reduce or increase, as the case may be, the amount of radiant energy falling on one of the thermopiles. It is to be noted that this latter effect could take place even if the radiation, let us say from the smoke stacks of the ship, were negligible. As to which of the two effects would have prominence would depend upon the time of day, existing atmosphere conditions, size and type of vessel and other such factors.

In scanning the ocean with such a system it is apparent that unless natural temperature inhomogeneities exist parallel to the horizon in either the water or sky separately, there would be no current flow in the galvanometer at any time. Since the divergence of each beam may be made small, an assumption of temperature equality is justified. Furthermore, there is no restriction on pointing the reflector system so that the imaginary beams may subtend water entirely, sky entirely, or any combination thereof, since vertical temperature changes are automatically balanced out. The presence of a ship in either beam is indicated immediately by a flow of current in the galvanometer. It may be readily determined which beam the ship is influencing by noting the sense of rotation necessary to produce a current flow in the galvanometer.

Another application of the system for the detection of aircraft will now be considered. The amount of heat radiated by the engine and exhaust of an airplane is relatively small compared to that actually radiated by large ships. Furthermore, on clear nights the effective temperature of the sky may be very cold compared to the temperature close to the earth. As a result of this large differential temperature there is always an appreciable thermopile current present in the case of a single thermopile, which would vary quite considerably depending on whether the reflector was pointed slightly above the horizon or at the zenith. Since detection of an airplane is a three-dimensional problem and large temperature inhomogeneities exist in the sky the necessity of an automatically balancing system is considerably more pronounced than in the case of ships.

As will be seen by reference to Figs. 2 and 3, the principle applies to aircraft quite as well as to water craft. Considering Fig. 3, the fuselage of airplane 10 there shown intercepts an appreciable part of beam 7. A relatively small galvanometer current will result from heat contributed by the engine and exhaust as gathered by reflector 4 and focused on thermopile 2. However, assuming the temperature of the fuselage as approximately that of the surrounding atmosphere, there will also be a galvanometer current due to an upset in balance because the fuselage partly shields one thermopile from the colder effective sky radiation. The relative size of a plane compared to a ship is small, but the effective differential temperatures are more favorable under the conditions in which the detection of aircraft would be desirable. Obviously unless the beam be very narrow, a dirigible would produce a much greater galvanometer deflection than would one airplane. The assumption is made here, as in the case of ships, that the effective background radiation differs from the temperature of the fuselage. In the case of airplanes there is considerably less probability as compared to the case of ships that the effect of background radiation will not be additional to the radiation contributed by the engines. Of course, whether the sign be plus or minus would depend upon the meterological situation.

It will be recognized that a system of the character above described employing two reflectors and two thermopiles is susceptible of modification without departing from the spirit of the invention. For example, the substantial equivalent would be a single reflector and two thermopiles disposed in such a way that each is located at an effective focus of slightly divergent beams. In other words, the exposed junctions of the two thermopiles are placed at separated points symmetrically related to the focus of a single reflector. This form or embodiment of the invention is diagrammatically shown in Fig. 4. It will be understood that the area of the exposed junctions, their separation and the optical constants of the reflector determine two solid angles quite analogous to solid angles and imaginary beams shown in Fig. 2. This is illustrated in Fig. 4a in which the numeral 1 designates a differential thermopile of the character shown diagrammatically in Figs. 4 and 5; the numeral 3 designates a parabolic reflector capable of control both in azimuth and elevation. It should be understood that the thermopile 1 comprises two thermoelectric generator units, or two sets of exposed junctions, and said units are located at points separated from each other and separately related to the focus of reflector 3. As previously suggested, the area of the exposed junctions or thermopile units employed in connection with this embodiment, the separation of the units and the optical constants of the single reflector determine two solid angles analogous to the beams shown in Fig. 2. The solid angles are here represented as at 6 and 7, a fraction of the radiation arising in either angle falling on the corresponding component of the thermopile 1. A source of radiation such as an airplane 10 entering solid angle 6, as here shown by way of example, will cause the balance of the system to be disturbed by adding to the radiation falling on one set of exposed junctions of the thermopile. Referring to Fig. 4a, the parallel rays of beam 6 are denoted by heavy dot and dash lines, while the parallel rays of beam 7 are denoted by dotted lines. These lines in the illustration are carried out to show how the two sets of rays of the independent beams maintain their separation and identity, and when reflected terminate in such manner as to fall upon the separated thermopile units, respectively. That this theory of operation is correct has been demonstrated by many tests. A heat source entering either angle or beam subtended thereby contributes only to the temperature change in the corresponding set of exposed junctions of one thermopile. The two thermopiles are connected as in the first form and act in opposition, polarity being indicated in Fig. 4, and current measurement is accomplished in the same way.

A third form or embodiment of the invention contemplates a single thermopile of special construction to be used with a single mirror or reflector. This third form is shown diagrammatically in Fig. 5. The individual junctions of this special form are arranged in sets, as will be seen more in detail in Figs. 6 and 7, and the junctions of each set or group are so connected that the E. M. F. resulting from heating either group as a set will be additive in that particular set. The separation and area of the two sets of exposed junctions, together with the optical constants of the reflector, determine two solid angles which may be made as large as desirable and with any divergence. It will be recognized that the special thermo-electric generator represents essentially an ordinary multi-junction thermopile with both sets of junctions symmetrically placed and exposed to the incoming radiation. The particular number and position of the junctions are only points of design. It will be recognized that if the number of junctions be reduced to two, then in accepted nomenclature the unit would properly be called a thermocouple instead of a thermopile.

A thermopile embodying the principles of the invention and designed to function along the lines of the modification generally described in the preceding paragraph is shown more in detail in Figs. 6 and 7. Referring more particularly to these views, the elements designated by the numeral 11 and here shown in the form of squares represent heat collectors for one set of exposed junctions, while those designated 12 represent heat collectors for the opposite set of exposed junctions. The junctions shown in Fig. 7 are designated by numerals 13 and 14, respectively, and in the present embodiment it will be noted that there are nine collectors and a like number of corresponding junctions in each set. The circuit arrangement and method of electrically connecting the junctions with their individual heat collectors is shown in the rear view (Fig. 7). The connections denoted by the heavier leads as at 15, for which bismuth wire may be employed, and the connections denoted by the lighter leads as at 16, for which silver wire may be used, are so connected to the junctions that when one set of junctions is heated or cooled with respect to the other set, the E. M. F. generated by individual junctions of the respective sets is additive within each set. It is understood, of course, that as a whole the one set or group is of opposite sign or polarity relative to the other, so that this form or embodiment functions in a manner similar to the other forms. It will be noted that terminal connections are provided as at 18 and 19 to which terminal leads 20 and 21 are run for electrical connection. Main plate 22 is of insulating material such as mica. The surface denoted by numeral 17 is interposed between the sets of collectors as a reflecting surface to send back undesired heat radiation falling between the sets of collectors, and is not in any way in the electrical circuit.

It is here pointed out that the square shape of the two sets of heat collectors produce or subtend two "effective beams" of square shape. As before stated, this form of thermopile is placed so that the respective sets of heat collectors are properly located at the approximate symmetrical focal points of a reflector so designed and dimensioned that the two imaginary beams will be about one degree square and that the beams will be separated by about one degree. As contemplated by the invention and as will be understood from the disclosure, if the total radiation on each of the two sets of heat collectors is the same, there will be no flow of current, since each set of junctions produces exactly the same E. M. F. and of opposite sign. However, radiation arising exclusively in one or the other solid angle will only fall on the corresponding set of heat collectors, producing thereby an unbalance in the E. M. F. with a consequent flow of current which may be measured.

It will be recognized that a single unit as described herein will suffice for the determination of an angle. Two such units operating on opposite ends of a known base-line will supply the information necessary to determine a position.

Changes and modifications are contemplated within the scope and spirit of the invention, as defined by the appended claims.

I claim:

1. A system for detecting objects by thermal radiation, comprising means for translating thermal radiation into electrical energy, said means including thermo-electric generating units coupled in balanced relation; means for collecting said radiation in the form of independent beams and for focusing said beams upon said units; a circuit including said units and means in said circuit to indicate the presence of a thermally radiating object against a similarly radiating background when its position relative to said beams causes a temperature differential between said units and whereby background effects are balanced out.

2. In a system for detecting objects by thermal radiation, means for translating thermal radiation into electrical energy, comprising thermo-electric generating units; means for collecting said radiation in the form of independent beams and for focusing said beams upon said units; circuit means for coupling said units in balanced relation when the total heat radiation on said units is the same whereby background effects are balanced out; and means responsive to variations of said circuit to indicate the presence of a thermally radiating object when its thermal reaction against a similarly radiating background causes a temperature differential between said units.

3. In a system for locating a body by thermal radiation, means comprising thermo-electric generators for translating thermal radiation into electrical energy; and means for balancing out temperature effects extraneous to said body, including means for collecting the radiation and focusing the same upon each of said generators in the form of independent beams; circuits connecting said generators in electrical opposition, whereby the electrical response of said generators is balanced when energized by the same effective temperature; and means in said circuits to indicate variations in the current response when the presence of a thermally radiating body by its thermal reaction against a similarly radiating background and relative to said beams causes a temperature differential between said units.

4. In a system for locating objects by their thermal reactions against a similarly radiating background, means for translating thermal radiation into electrical energy, comprising thermopile units operatively coupled in balanced relation; means for balancing out temperature effects extraneous to an object to be located, comprising means for collecting the total thermal radiation in separately defined beams and focusing said beams upon the units separately; and an electrical circuit connecting said units in opposition, and including means to indicate the presence of a thermally radiating object in terms of the current response when said units are subjected to a temperature differential caused by said thermally radiating object.

5. In a system for locating objects by thermal radiation, the method of balancing out the temperature effects from sources extraneous to an object to be located, which comprises the step of first collecting the radiation from said sources while causing the collected radiation to be concentrated in the form of independent beams; translating the thermal energy of said beams into their electrical equivalents; combining the electrical equivalents in opposition whereby the extraneous effects are balanced out; and detecting a thermally radiating object in terms of the electrical response when by its presence against a similarly radiating background said object causes a temperature differential between said beams.

6. In a system for locating objects by thermal radiation, the method of balancing out the temperature effects from sources extraneous to an object to be located, which comprises the step of collecting the radiation from said sources in separately defined beams; translating the thermal energy of said beams into their electrical equivalents; combining the electrical equivalents in opposition whereby the extraneous effects are balanced out; and detecting a thermally radiating object in terms of the electrical response when by its presence relative to the beams and against a similarly radiating background said object causes a temperature differential between the same.

7. In a system for locating objects by thermal radiation, means for balancing out the temperature effects from sources extraneous to an object, comprising parabolic reflectors for collecting radiations of thermal energy in independent beams; thermopile units disposed at the focal points of said reflectors for converting the concentrated energy of said beams into their electrical equivalents; a circuit for coupling said units in balanced electrical opposition; and means in said circuit to indicate variations in current response when the presence of a thermally radiating object by its thermal reaction against a similarly radiating background and relative to said beams causes a temperature differential between said units.

8. In a system for locating objects by thermal radiation, means for collecting said radiation comprising a reflector whose characteristics determine at least two solid angles subtending independent beams; means for balancing out temperature effects extraneous to an object comprising thermopile units disposed at points in separated relation to the focus of said reflector for converting the concentrated energy of said beams into their respective electrical equivalents; circuit connections for coupling said units in balanced electrical opposition; and means in said circuit to indicate the presence of an object when its heat energy radiation causes a temperature differential between said units.

9. In a system for locating objects by thermal raditaion, means for collecting said radiation comprising a reflector whose characteristics determine at least two solid angles subtending independent beams; means for balancing out temperature effects extraneous to an object to be located comprising a thermopile having two sets of exposed junctions, each having the same total heat collecting capacity, and said sets being disposed at points separated in relation to the focus of said reflector for converting the concentrated energy of said beams into their respective electrical equivalents; a circuit for coupling said sets in balanced electrical opposition; and means in said circuit to indicate the presence of an object in terms of current variations corresponding to the temperature differential between said sets of junctions caused by the thermal effects of said object.

10. Means for locating a body by the temperature differential between the body and its surroundings, comprising thermo-electric generating units, said units being coupled in balanced electrical opposition; means for collecting thermal radiation in the form of separately defined beams and for focusing said beams upon said units; a circuit including said units and means in said circuit to indicate the presence of a thermally radiating body by the current response when the position of said body relative to said beams by its thermal reaction against a similarly radiating background causes a temperature differential between said units and whereby background effects are balanced out.

11. In a system for locating objects by thermal radiation, means for collecting said radiation comprising a reflector whose characteristics, in combination with thermopile units disposed at separated points symmetrically related to the focus of said reflector, determine at least two solid angles subtending independent beams, said units acting to convert the concentrated energy of said beams into their respective electrical equivalents; circuit connections for coupling said units in balanced electrical opposition whereby background effects are balanced out; and means in said circuit to indicate the presence of a thermally radiating object against a similarly radiating background when its heat energy radiation causes a temperature differential between said units.

12. In a system for detecting objects by their natural thermal characteristics relative to background radiation, means comprising thermo-electric generating units for translating thermal radiation into electrical energy; means for collecting and focusing said radiation upon said units in separately defined beams, said means comprising a reflector having said units located at separated points in relation to its focus; a circuit including said units in balanced electrical opposition whereby background effects are balanced out, and means in said circuit to indicate the presence of a thermally radiating object against a similarly radiating background when its position relative to the collected field of energy causes a temperature differential between said units.

13. In a system for detecting objects by their natural thermal characteristics relative to background radiation, means for collecting thermal energy comprising a reflector in combination with thermo-electric generating units disposed at separated points in relation to the focus of said reflector so as to determine at least two solid angles subtending independent beams, said units acting to convert the thermal energy of said beams concentrated thereon into their respective electrical equivalents; means including a circuit and means whereby the current in such circuit is responsive to the differential energies received by said units; and means in said circuit to indicate the presence of a thermally radiating object against a similarly radiating background when its position relative to said beams causes a temperature differential between said units.

14. In a system for locating objects by thermal radiation, means for collecting said radiation comprising a reflector whose characteristics, in combination with thermopile units disposed at separately located points in relation to the focus of said reflector, determine at least two solid angles subtending independent beams, said units acting to convert the concentrated energy of said beams into their respective electrical equivalents; circuit connections for coupling said units in balanced electrical opposition; and means in said circuit to indicate the presence of a thermally radiating object against a similarly radiating background when its position relative to said beams causes a temperature differential between said units.

15. The method of locating a body by the radiant energy differential between the body and its background, which comprises the step of collecting radiation from said background in separately defined beams; converting the energy of said beams into their electrical equivalents; combining the said equivalents in opposition; and detecting the object in terms of the electrical response when by its presence in relation to said beams said object causes a differential response between them.

16. The method of detecting an object by thermal radiation which includes focusing at a first point the thermal radiation from the object and focusing at a second point the thermal radiation from a limited portion of the background existing adjacent the object, said focusing being carried out such that the radiations focused at the second point is solely due to background effects and unaffected by radiation from the object, whereby a difference in the energies thus focused in the first and second beams exists depending on presence of the object, and measuring and indicating the differential energies of said focused beams.

HAROLD A. ZAHL.